F. ALGER.

Improvement in Steam Carriages for Common Roads.

No. 115,802. Patented June 13, 1871.

Witness: William Edson, J. L. Newton

Francis Alger, Inventor

115,802

UNITED STATES PATENT OFFICE.

FRANCIS ALGER, OF BOSTON, MASSACHUSETTS.

IMPROVEMENT IN STEAM-CARRIAGES FOR COMMON ROADS.

Specification forming part of Letters Patent No. 115,802, dated June 13, 1871; antedated May 29, 1871.

*To all whom it may concern:*

I, FRANCIS ALGER, of Boston, in the county of Suffolk and State of Massachusetts, have invented a certain new and useful Improvement in Steam-Carriages for Common Roads, of which the following is a complete specification:

Nature and Objects of the Invention.

The nature of my invention consists in combining certain improved devices to a steam-carriage to facilitate the management and running of the same. The peculiar character of these devices can only be understood by reference to the drawing and specification.

General Description.

Figure 1:
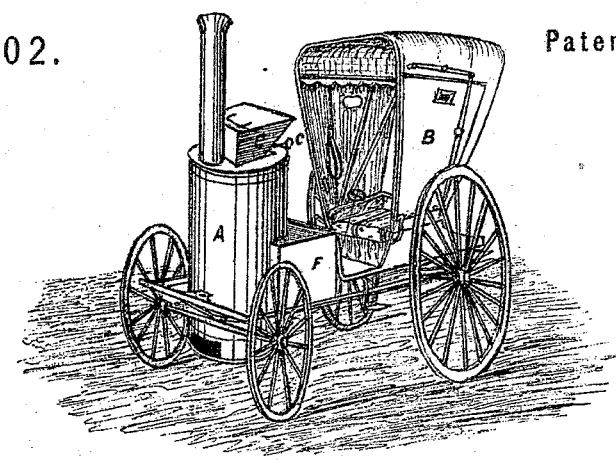
Figure 1 is a perspective view of the carriage.
Figure 2:
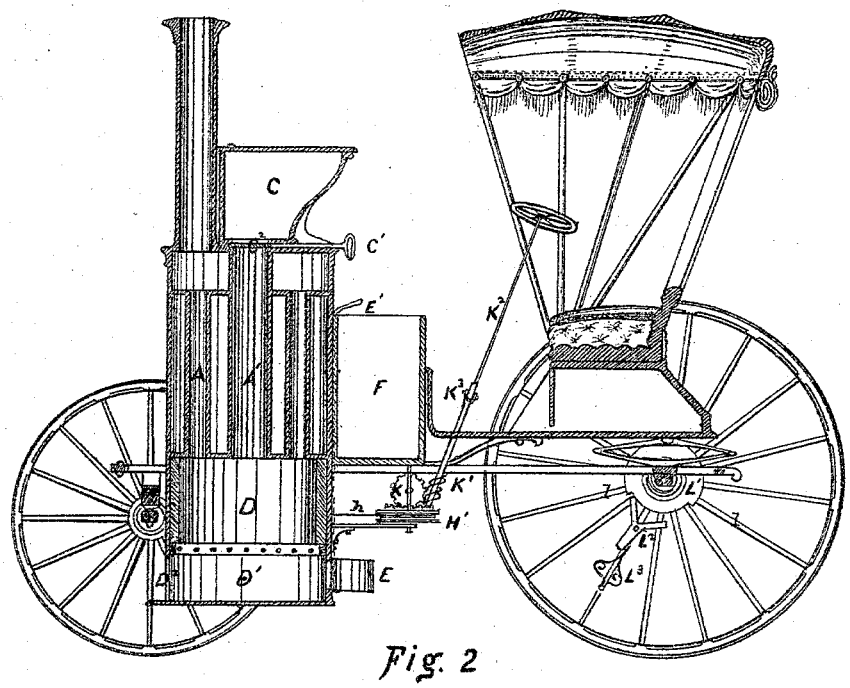
Fig. 2 is a vertical section of the same.
Figure 3:
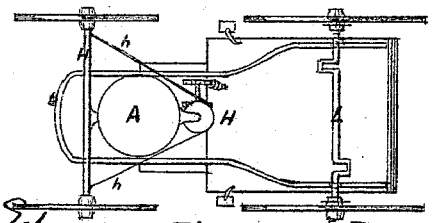
Fig. 3 is a plan, showing the under side of the same.

$a$ represents the boiler, which is hung upon a suitable frame, and near the forward axle, as shown in the drawing. This boiler is a vertical tubular one, and has a central fuel-tube, A, but is not a base-burner. C is a fuel-hopper, located as shown, and is provided with a sliding bottom, $C^2$, operated by the handle $C^1$. Surplus fuel may be stored in the fuel-box F. The ash-pit D has an open grill in front and a door, E, in the rear. This door is closed and opened by the handle E', Fig. 2. The forward axle is pivoted at the center, so that by turning it the carriage may be directed at will. This is effected by the following device: $h\ h$, Fig. 3, is a rope or chain attached to the axle, as shown, and passed around the grooved wheel H'. This grooved wheel H' is made to rotate by the gear K, Fig. 2, which, in its turn, is driven by the endless screw $K^1$. $K^2$ is a handle, having a toggle-joint, $K^3$, and serves to turn the screw $K^1$. The joint $K^3$ allows the handle $K^2$ to be bent away from the seat for convenience in getting in and out. The rear axle L may be provided with cranks or gear, and may be driven by any of the ordinary engines now in use for this purpose. The rear wheels are not rigidly affixed to the axle, but are so arranged that they may revolve independently of it. $L^1$, Fig. 2, is a disk attached rigidly to the axle, and has notches $l\ l$ so arranged in connection with the double pawl $L^2$, which is affixed to the wheel, that the axle can revolve in one direction only without causing the wheel to revolve also. As the pawl is set in Fig. 2, the revolving of the axle would cause the wheel to go forward; but if the spring $L^3$ be placed upon the other side of the pawl, then the carriage may be made to go backward. The object of the pawl $L^2$ and disk $L^1$ is to allow one wheel to go faster than the other, as it has a tendency to when the carriage is being turned. Thus, if the carriage is going forward, the wheel on the inner side of the circle would be driven by the axle and carry the carriage along; but the wheel on the outside revolves faster than the axle. Thus it would be free to do, as the pawl $L^2$ would be carried backward over the notches in the disk $L^1$. By this arrangement the carriage may be turned easily.

What I claim as my invention is—

1. The steering-handle $K^2$, when provided with a toggle-joint, $K^3$, in combination with endless screw $K^1$, gear K, wheel H', and steering-ropes $h\ h$, substantially as described, and for the purpose set forth.

2. The combination of the double pawl $L^2$, the disk $L^1$, and axle L, operating substantially as described, and for the purpose set forth.

FRANCIS ALGER.

Witnesses:
  WILLIAM EDSON,
  E. A. NICKERSON.